US011016728B2

United States Patent
Flores et al.

(10) Patent No.: US 11,016,728 B2
(45) Date of Patent: May 25, 2021

(54) ENHANCING PRESENTATION CONTENT DELIVERY ASSOCIATED WITH A PRESENTATION EVENT

(71) Applicant: INTERNATIONAL BUSINESS MACHINES CORPORATION, Armonk, NY (US)

(72) Inventors: Romelia H. Flores, Keller, TX (US); Erik H. Katzen, Argyle, TX (US); Paulo Henrique Leal, Pernambuco (BR); Sumit Patel, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 14/326,619

(22) Filed: Jul. 9, 2014

(65) Prior Publication Data

US 2016/0011729 A1 Jan. 14, 2016

(51) Int. Cl.
*G06F 3/048* (2013.01)
*G06F 3/16* (2006.01)
*G06Q 30/02* (2012.01)
*G06Q 50/20* (2012.01)
*G06Q 10/10* (2012.01)
*G06Q 50/00* (2012.01)

(52) U.S. Cl.
CPC .......... *G06F 3/167* (2013.01); *G06Q 10/101* (2013.01); *G06Q 30/0201* (2013.01); *G06Q 50/01* (2013.01); *G06Q 50/20* (2013.01)

(58) Field of Classification Search
CPC .................................................. G06F 3/0484
See application file for complete search history.

(56) References Cited

U.S. PATENT DOCUMENTS 5,823,788 A * 10/1998 Lemelson ................ G09B 7/04
434/350
6,304,259 B1 * 10/2001 DeStefano ............ G06F 16/338
715/805

(Continued)

OTHER PUBLICATIONS

Khoo et al., "Heat Map Visualizations of Seating Patterns in an Academic Library", iConference 2014 Proceedings, pp. 612-620, doi:10.9776/14274, Mar. 2014.*

(Continued)

*Primary Examiner* — Xuyang Xia
(74) *Attorney, Agent, or Firm* — Aaron N. Pontikos

(57) ABSTRACT

A presenter and an audience associated with a presentation event can be detected. The presentation event can be a real world occurrence and/or a computing session occurrence. The presenter can convey a presentation content to the audience. Presentation data associated with the presentation event can be identified. The presentation data can include the presentation content. The presentation content can include a text and/or a media. A real-time metrics associated with the presenter and the audience can be captured from one or more computing devices associated with the presenter and the audience during the presentation event. The real-time metrics can be analyzed to determine a presenter and an audience recommendation. The presenter recommendation can be presented to the presenter and the audience recommendation to an audience member.

18 Claims, 7 Drawing Sheets

(56) References Cited

U.S. PATENT DOCUMENTS

| | | | | |
|---|---|---|---|---|
| 6,308,187 B1* | 10/2001 | DeStefano | G06F 16/90348 | 715/234 |
| 6,411,988 B1* | 6/2002 | Tafoya | H04L 12/1813 | 370/260 |
| 7,050,978 B2 | 5/2006 | Silverstein et al. | | |
| 7,234,943 B1* | 6/2007 | Aleali | G09B 7/00 | 434/236 |
| 8,670,018 B2 | 3/2014 | Cunnington et al. | | |
| 8,977,965 B1* | 3/2015 | Ehlen | G06F 3/0482 | 715/719 |
| 2003/0034999 A1* | 2/2003 | Coughlin, III | G09B 7/00 | 715/738 |
| 2003/0200543 A1* | 10/2003 | Burns | H04H 60/33 | 725/16 |
| 2003/0227479 A1* | 12/2003 | Mizrahi | A63F 13/10 | 715/753 |
| 2005/0240407 A1* | 10/2005 | Simske | G10L 15/26 | 704/246 |
| 2006/0106611 A1* | 5/2006 | Krasikov | G09B 19/04 | 704/270 |
| 2006/0252547 A1* | 11/2006 | Mizrahi | A63F 13/10 | 463/42 |
| 2007/0150583 A1* | 6/2007 | Asthana | G06Q 10/06 | 709/224 |
| 2007/0282948 A1* | 12/2007 | Praino | G06Q 10/10 | 709/204 |
| 2008/0120101 A1* | 5/2008 | Johnson | G10L 15/22 | 704/235 |
| 2008/0126179 A1* | 5/2008 | Norfolk | G06Q 30/0203 | 705/7.32 |
| 2008/0133663 A1* | 6/2008 | Lentz | H04N 7/15 | 709/204 |
| 2009/0089057 A1* | 4/2009 | Batot | G10L 15/26 | 704/251 |
| 2009/0241033 A1 | 9/2009 | Mujtaba | | |
| 2009/0287678 A1* | 11/2009 | Brown | G06F 17/30654 | |
| 2009/0319917 A1* | 12/2009 | Fuchs | H04M 3/56 | 715/753 |
| 2010/0079585 A1* | 4/2010 | Nemeth | H04N 13/0434 | 348/54 |
| 2010/0169134 A1* | 7/2010 | Cheng | G06Q 10/06398 | 705/7.42 |
| 2011/0125734 A1* | 5/2011 | Duboue | G09B 7/00 | 707/723 |
| 2011/0295392 A1* | 12/2011 | Cunnington | G06Q 10/10 | 700/90 |
| 2012/0159331 A1* | 6/2012 | Greve | H04L 67/22 | 715/730 |
| 2012/0226984 A1* | 9/2012 | Bastide | G06Q 10/107 | 715/730 |
| 2012/0324491 A1* | 12/2012 | Bathiche | H04H 60/33 | 725/10 |
| 2013/0066886 A1* | 3/2013 | Bagchi | G06F 17/30654 | 707/749 |
| 2013/0080966 A1* | 3/2013 | Kikin-Gil | G06F 3/0483 | 715/776 |
| 2013/0232516 A1 | 9/2013 | Paull | | |
| 2013/0252222 A1* | 9/2013 | Fox | G09B 7/00 | 434/350 |
| 2013/0265314 A1 | 10/2013 | Laughlin | | |
| 2014/0081636 A1* | 3/2014 | Erhart | G10L 15/065 | 704/236 |
| 2014/0176665 A1* | 6/2014 | Gottlieb | H04L 65/403 | 348/14.08 |
| 2014/0207819 A1* | 7/2014 | Hiremath | G06F 17/30554 | 707/771 |
| 2014/0229866 A1* | 8/2014 | Gottlieb | H04L 12/1822 | 715/758 |
| 2014/0309998 A1* | 10/2014 | Basson | G10L 25/00 | 704/270 |
| 2015/0052440 A1* | 2/2015 | Livingston | G06F 3/04845 | 715/732 |
| 2015/0081734 A1* | 3/2015 | Mason | G06Q 10/10 | 707/772 |
| 2015/0082194 A1* | 3/2015 | Rai | H04L 12/1827 | 715/753 |
| 2015/0095267 A1* | 4/2015 | Behere | G06F 16/3329 | 706/11 |
| 2015/0234571 A1* | 8/2015 | Lee | G06F 3/0488 | 715/721 |
| 2015/0347560 A1* | 12/2015 | Skrobotov | G06F 17/30598 | 707/738 |

OTHER PUBLICATIONS

Wilson, "At Fashion Week, Its Where You Sit That Counts", http://www.nytimes.com/2010/09/08/fashion/08Fashion.html, Sep. 8, 2010.*

* cited by examiner

ENHANCING PRESENTATION CONTENT DELIVERY ASSOCIATED WITH A PRESENTATION EVENT

BACKGROUND

The present invention relates to the field of automated content delivery and, more particularly, to enhancing presentation content delivery associated with a presentation event.

Currently, when a presenter delivers a presentation (e.g., slideshow presentation) to a live or virtual audience, the presenter often encounters several hurdles. Typically, many presenters find connecting with the audience to be difficult, whether the audience is made up of a few people or a mass of thousands. Some of this difficulty often stems from the presenter's inability to know of the audience expertise level and/or the audience interests within a topic of a presentation. Frequently, the presenter can be uncertain whether they are describing a topic of the presentation at the appropriate level of detail, are answering the audience's questions sufficiently, are talking too long or too short on a particular subject, and even know who is in attendance at a large conference.

Many of these hurdles can be amplified when part or all of an audience is virtual. For example, when a presentation includes a Web cast with audience members in different countries, the presenter can be overwhelmed and under-equipped to address audience needs. Furthermore, a few extroverted people can be the voice for a large conference audience when they represent the minority of the audience in terms of level of understanding. As such, a presenter can often benefit from tooling which can enhance the presenter's capabilities to address these shortcomings.

BRIEF SUMMARY

One aspect of the present invention can include a system, an apparatus, a computer program product, and a method for enhancing presentation content delivery associated with a presentation event. A presenter and an audience associated with a presentation event can be detected. The presentation event can be a real world occurrence and/or a computing session occurrence. The presenter can convey a presentation content to the audience. Presentation data associated with the presentation event can be identified. The presentation data can include the presentation content. The presentation content can include a text and/or a media. A real-time metrics associated with the presenter and the audience can be captured from one or more computing devices associated with the presenter and the audience during the presentation event. The real-time metrics can be analyzed to determine a presenter and an audience recommendation. The presenter recommendation can be presented to the presenter and the audience recommendation to one or more audience members.

Another aspect of the present invention can include a method, an apparatus, a computing program product, and a system for enhancing presentation content delivery associated with a presentation event. A presentation engine can be configured to enhance a presentation content delivery associated with a presentation event. The enhancement can be a presenter recommendation and an audience recommendation. The presenter recommendation can be a recommendation for improving content delivery. The audience recommendation can be a recommendation for enhancing content reception or usage. The event can be associated with a presenter and an audience. The content delivery can be automatically performed responsive to real-time metrics obtained from the audience. A data store can be configured to persist the presentation content and a user profile associated with the presenter and the audience.

DETAILED DESCRIPTION

Figure 1A:
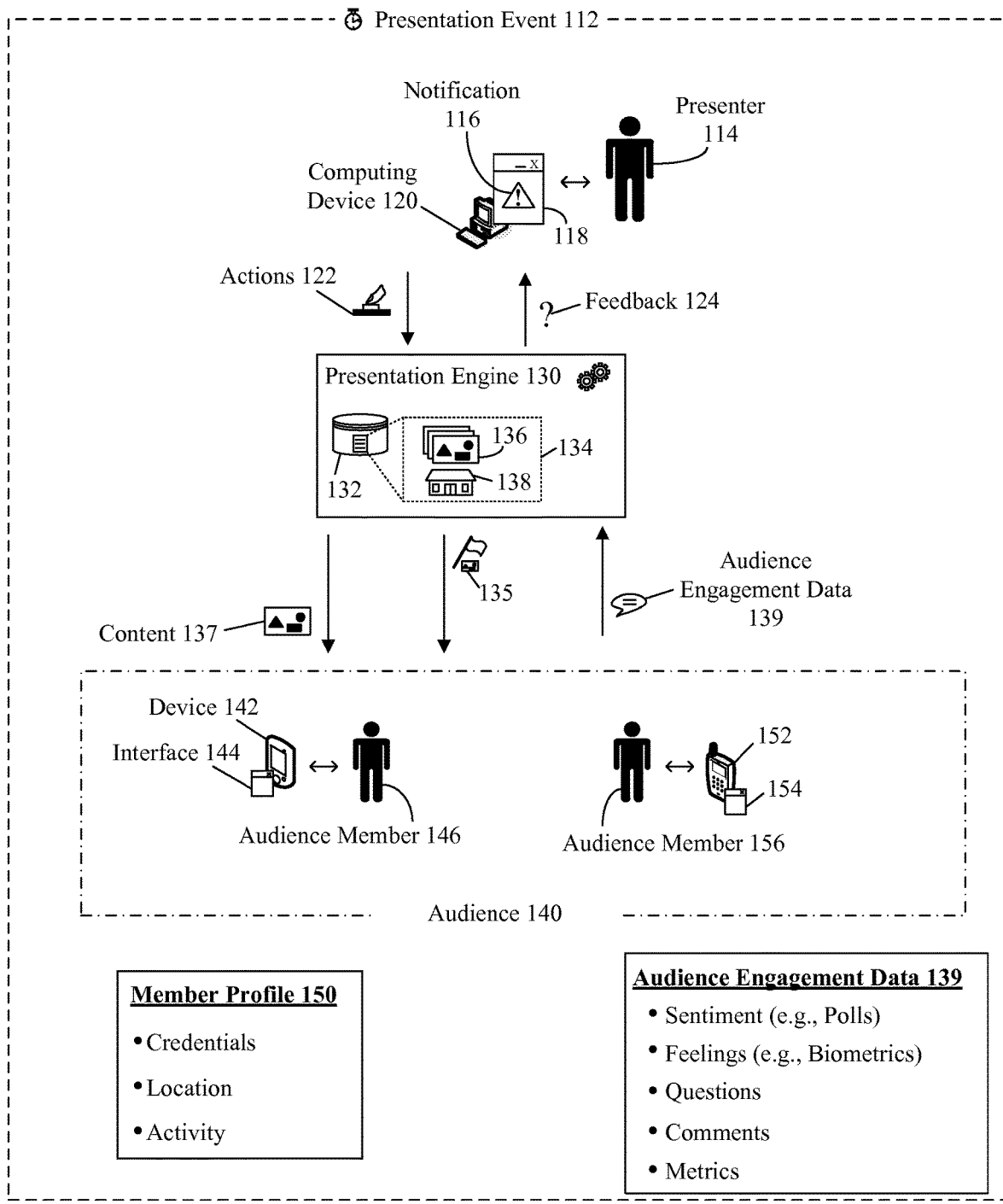
FIG. 1A is a schematic diagram illustrating a scenario for enhancing presentation content delivery associated with a presentation event in accordance with an embodiment of the inventive arrangements disclosed herein.

The present disclosure is a solution for enhancing presentation content delivery associated with a presentation event. In the solution, a presentation engine can assist presenters and audience members by providing recommendations during the event. In one instance, the engine can provide pre-event and/or post-event recommendations (e.g., follow ups) which can enable audience members to connect with each other based on skill level, proximity, interest, and the like. In one embodiment, the engine can provide real-time recommendations for a presenter including, but not limited to, speech based recommendations (e.g., word usage, word avoidance), content delivery recommendations (e.g., supplemental content 135), and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a scenario 110 for enhancing presentation content delivery associated with a presentation event in accordance with an embodiment of the inventive arrangements disclosed herein. Scenario 110 can be present in the context of interface 160, 180, method 200, embodiment 310, process 410, 450, and/or 510.

The disclosure can enable pre-presentation venue selection based on user preferences, enabling audience members to share sentiments on a presentation via mobile technology and can permit sensing presenter deficiencies to improve the presenter's effectiveness. The disclosure functionality can be present within one or more IBM or non-IBM products including, but not limited to, IBM LOTUS SYMPHONY, IBM CONNECTIONS SUITE, IBM SOCIAL LEARNING, IBM SAMETIME, IBM COGNOS, IBM WATSON and the like. In one instance, the disclosure can leverage one or more IBM software suites to enable the functionality described herein.

As used herein, a presentation event 112 can be an occurrence associated with a presenter 114, a presentation data 134, and/or an audience 140. Event 112 can include a real world occurrence and/or a computing event (e.g., computing session) associated with the real world occurrence. In one instance, event 112 can be a process of presenting a topic (e.g., content 137) to an audience 140. That is, event 112 can be a demonstration, a lecture, or a speech meant to inform, persuade, or build good will. For example, event 112 can be a product unveiling during a keynote speech at an electronics convention.

Presenter 114 can be associated with a presentation data 134, a computing device 120, and/or an audience 140. For example, a slideshow presentation 136 can be linked to the presenter 114 via the user identity of the presenter (e.g., user credentials of device 120). Presentation data 134 can include, but is not limited to, presentation 136, venue information 138, metrics, supplemental content 135, and the like. Venue information 138 can include, but is not limited to, resource availability (e.g., projectors, microphones, podium), seating availability, seating map (e.g., arrangement), and the like. It should be appreciated that venue 138 information can include non-tangible resource information including, but not limited to, services, personnel expertise, and the like. Presentation 136 can include, but is not limited to, content 137, metadata, references to supplemental content 135, and the like. Presentation 136 can include presentation files which can conform to text files, graphics files, audio files, and the like. Presentation 136 files can conform to one or more traditional and/or proprietary formats including, but not limited to, an OPENOFFICE OpenDocument Format (ODF), a Portable Document Format, and the like.

Audience 140 can include one or more audience members 146, 156 which can interact with presentation engine 130 (e.g., via device 142, 152). Audience 140 members 146, 156 can be locally or remotely present. Member 146, 156 can be associated with one or more computing devices 142, 152. Devices 142, 152 can include, but is not limited to, a tablet computing device, a laptop, a wearable computing device (e.g., a smart watch, head mounted computer), a mobile phone, and the like. Devices 142, 152 can be associated with one or more interfaces 144, 154. Interfaces 144, 154 can present one or more content 137, supplemental content 135, notifications, and the like. For example, interfaces 144, 154 can present an audience member dashboard 180 (e.g., user specific interface) which can permit the member 146, 156 to interact with other audience members or presenter 114 in real-time.

Presentation engine 130 can be utilized to facilitate real-time or near real-time interaction between presenter 114 (e.g., device 120) and/or audience 140 (e.g., device 142, 152). Engine 130 can include, but is not limited to, a data store, one or more analytic components, data collection components, and the like. In one instance, engine 130 can persist presentation data 134 which can be utilized to enhance content 137 delivery prior to, during, and after presentation event 112. In one instance, the engine can permit key audience member tracker (e.g., via member profile 150) permitting the presenter to be alerted when key audience members are present within the audience 140. For example, the presenter can view a map of the venue with key audience members identified (e.g., highlighted, icons).

Member profile 150 can be a data set for enabling data 139 collection, member tracking, and the like. Profile 150 can include, but is not limited to, member credentials, location information, activity data, sharing settings, and the like. Profile 150 can be manually and/or automatically generated from historic settings, engagement data 139, device 142, 152 settings, and the like.

In scenario 110, a presentation event 112 can include a presenter 114 interacting with a computing device 120 and/or an audience 140. The presentation engine 130 can facilitate real-time interaction and presentation content delivery enhancement between the presenter 114 and the audience 140. In one instance, as presenter presents content 137, audience engagement data 139 can be collected. It should be appreciated that content 137 can be manually and/or automatically selected. For example, based on user questions/sentiment (e.g., data 139), a supplemental content 135 can be automatically conveyed to one or more members of audience 140 without requiring interaction from presenter 114. It should be understood that supplemental content 135 can be manually and/or automatically identified and conveyed. For example, supplemental content 135 can be determined based on keyword matching question keywords with content keywords. It should be appreciated that engine 130 can support auditing and/or notification capabilities enabling presenter 114 to be informed of automatic content delivery, venue information 138 changes, member 146, 156 location changes, and the like.

In one instance, data 139 can be utilized to provide real-time or near real-time feedback 124 to presenter 114 during or after event 112. In one instance, feedback 124 can be presented within interface 118 of computing device 120. For example, when content 137 is confusing, an audience sentiment notification (e.g., notification 116) can be presented to allow the presenter to be notified of the confusing content. That is, the disclosure can permit a real-time or near real-time view of audience sentiment (e.g., audience pulse). In one embodiment, feedback 124 can include one or more recommendations which can be presented within interface 118. In the embodiment, notification 116 can include the recommendation which can direct a presenter 114 to perform one or more actions. For example, the recommendation can advise the presenter to clarify confusing content 137 by spending additional time explaining the content 137 or switching to supplemental content 135.

Actions 122 can include, but is not limited to, conveying content 137, directly interacting with audience members (e.g., 146, 156), creating annotations, and the like. As content 137 is consumed by audience 140, engagement data 139 can be collected via device 142, 152. It should be appreciated, that data 139 collection can be active (e.g., user input) and/or passive (e.g., biometrics). Engagement data 139 can include, but is not limited to, user sentiment (e.g., polling data), feelings (e.g., facial expressions), questions, comments, metrics, and the like. For example, body movement can be measured to determine interest levels of audience 140 which can be utilized to improve presenter 114 awareness of audience sentiment.

In one instance, each member 146, 156 of audience 140 can be associated with a member profile 150 which can enable dynamic social networking opportunities. Profile 150 can be analyzed to determine audience members which are performing the same activity (e.g., taking a questionnaire/survey), viewing the same content 137, have similar skill levels, and the like. In one embodiment, a presenter 114 can be associated with a presenter profile which can enable audience members to view presenter 114 skill set, background expertise, historic presentations events, and the like.

Drawings presented herein are for illustrative purposes only and should not be construed to limit the invention in any regard. It should be appreciated that the disclosure can permit pre-event and post event recommendations which can enable improved event 112 coordination, content delivery, and the like. In one instance, the functionality of the disclosure can be present within a productivity software suite. It should be appreciated that the disclosure can utilize traditional and/or proprietary metadata tagging functionality to permit the capabilities described herein.

In one embodiment, the disclosure can automatically detect resource availability for a presentation event. In the embodiment, the disclosure can provide recommendations based on resource availability. For example, when a digital projector is unavailable at a venue, the presenter can be notified and an automated request can be submitted to allocate a suitable projector.

In one instance, the disclosure can provide follow-up recommendations to audience members 146, 156 to enable an improved experience associated with the presentation event. In the instance, a follow-up recommendation can include, but is not limited to, a supplemental content 135 recommendation, a post event audience meeting, a post-event presenter question and answer (Q&A) session, or a predefined answer for simple questions Interface 118, 144, 154 can be a user interactive interface permitting interaction and/or presentation of profile 150, feedback 124, content 137, recommendation, and the like. Interface 118, 144, 154 capabilities can include a graphical user interface (GUI), voice user interface (VUI), mixed-mode interface, and the like. In one instance, interface 118 can be associated with a presentation software program including, but not limited to, IBM LOTUS SYMPHONY PRESENTATIONS, OPENOFFICE IMPRESS, and the like.

Figure 1B:
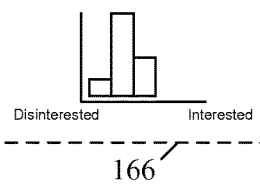
FIG. 1B is a schematic diagram illustrating a set of interfaces for enhancing presentation content delivery associated with a presentation event in accordance with an embodiment of the inventive arrangements disclosed herein.
Figure 1B:
Figure 1B:
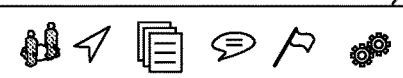

FIG. 1B is a schematic diagram illustrating an interface 160, 180 for enhancing presentation content delivery associated with a presentation event in accordance with an embodiment of the inventive arrangements disclosed herein. Interface 160, 180 can be user interface dashboards able to aggregate presentation event information (e.g., data 139, profile 150, feedback 124) within one or more screens.

Interface 160 can be a customized interface which can assist presenter 114 prior to, during, and after presentation event 112. Interface 160 can include, but is not limited to, notification section 161, annotation section 164, audience sentiment section 166, questions section 168, control panel 169, and the like. It should be appreciated that interface 160 can leverage presentation data 134, audience engagement data 139, member profile 150, presenter profile (not shown), and the like to present relevant metrics associated with event 112. It should be understood that interface 160 can include timing recommendations (e.g., time left) which can assist presenter with timely content presentation.

In one instance, presenter 114 voice levels can be analyzed to determine suitable voice thresholds (e.g., decibel level) for the presenter 114. In the instance, when presenter 114 voice level (e.g., loudness, softness) lies outside the thresholds, a notification 162 can be presented. For example, when the presenter 114 is speaking too softly, notification 162 can alert the presenter 114 to the audience's inability to hear the presenter 114. It should be appreciated that presenter 114 voice threshold can be associated with a presenter profile.

Annotation section 164 can include one or more presenter authored notes which can be associated with a content (e.g., topic, slide, etc). In one instance, annotation 164 can be a voice annotation which can be created by voice command during event 112. Annotation section 164 can include historic annotations, content links (e.g., hyperlinks), and the like.

Audience sentiment section 166 can be an area for indicating audience interest in presenter 114 and/or content 137. In one instance, sentiment section 166 can include one or more graphical visualizations. For example, sentiment 166 can be a bar graph indicating interest or disinterest. It should be appreciated that section 166 can be associated with a log which can persists historical views of sentiment.

Questions section 168 can include one or more audience submitted questions which can be presented in real-time or near real-time. In one instance, section 168 can be dynamic enabling questions to be added and/or removed based on presenter 114 actions, content 137 presentation, and the like. For example, when a presenter 114 answers an audience member's question, the question can be removed from section 168. It should be appreciated that section 168 can be associated with a log which can persist historic questions.

It should be appreciated that control panel 169 can permit interface 160 customization. Control panel 169 can facilitate the management of presenter profile, location settings, presentation data, social networking settings, and the like.

Interface 180 can be a customized interface which can assist audience members prior to, during, and after presentation event 112. Interface 180 can include, but is not limited to, social section 181, submission section 184, poll section 186, personal section 188, control panel 189, and the like.

In one instance, social section 181 can present one or more recommendations for interacting with proximate audience members. In the instance, section 181 can include social recommendation 182 which can permit audience members with similar questions to be easily contacted.

In submission section 184, audience members can be allowed to submit questions for the presenter 114 to address during event 112. For example, section 184 can permit an audience member to submit a question to the presenter in real-time during content 137 presentation. It should be appreciated that section 184 is not limited to questions and can support comments.

Poll section 186 can be a user input section which can be utilized to dynamically assess audience engagement. Poll section 186 can include polls, surveys, questionnaires, and the like. It should be appreciated that section 186 can be arbitrarily complex. In one instance, poll section 186 can include automatically generated polls based on audience engagement data 139.

In personal section 188, audience member activity can be presented. Section 188 can include, historic activity, historic questions, historic comments, and the like. For example, section 188 can permit audience members to view historic content which was automatically delivered based on the member's question.

In one embodiment, interface 180 can permit text exchanges with audience members and/or presenter. Text exchange can include, but is not limited to, electronic mail, instant message, and the like.

Drawings presented herein are for illustrative purposes only and should not be construed to limit the invention in any regard. It should be appreciated that control panel 189 can permit interface 180 customization. Control panel 189 can facilitate the management of audience member profile, location settings, presentation data, social networking settings, and the like.

Figure 2:
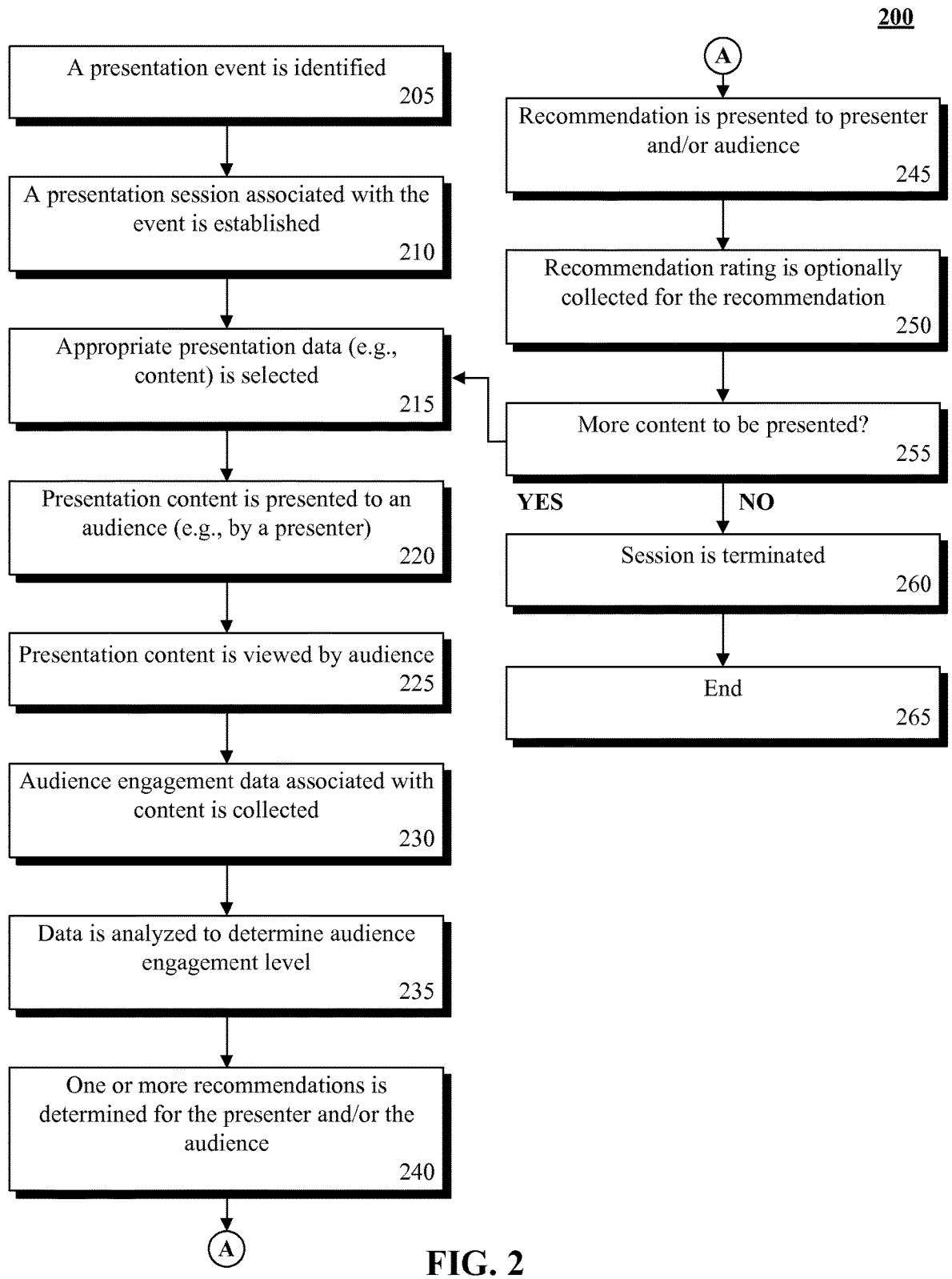
FIG. 2 is a schematic diagram illustrating a method for enhancing presentation content delivery associated with a presentation event in accordance with an embodiment of the inventive arrangements disclosed herein.

FIG. 2 is a schematic diagram illustrating a method 200 for enhancing presentation content delivery associated with a presentation event in accordance with an embodiment of the inventive arrangements disclosed herein. Method 200 can be present in the context of scenario 110, embodiment 310, process 410, 450, and/or 510.

In step 205, a presentation event can be identified. The event can be manually and/or automatically identified. For example, the event can be identified when a presenter is at a venue location at a previously established event time. In step 210, a presentation session associated with the event can be established. The session can be a computing session which can be utilized to track/manage presentation data, presenter information, audience information, audience engagement data, and the like. In step 215, an appropriate presentation data can be selected. Data can include but is not limited to, a presentation file (e.g., slideshow files), supplemental content 135 (e.g., video/audio content), and the like. In step 220, presentation content can be presented to an audience. For example, content can be conveyed to devices used by audience members when a presenter starts a slideshow presentation. In step 225, the audience can view the presentation content. It should be appreciated that content can include interactive content, non-interactive content, and the like. In step 230, audience engagement data associated with the content can be collected.

In step 235, data can be analyzed to determine audience engagement level. For example, data can be processed to produce an engagement score (e.g., 1-10) which can indicate audience participation/interest. In step 240, one or more recommendations can be determined for the presenter and/or the audience. Recommendations can include, but is not limited to, social recommendations (e.g., connecting with other users), behavioral recommendations (e.g., word usage adjustments), and the like. In step 245, the recommendations can be presented to the presenter and/or the audience. In step 250, a recommendation rating can be optionally collected for the recommendations. For example, an audience member or presenter can rate the usefulness of a recommendation, enabling subsequent recommendations to continually improve. In step 255, if there is more content to be presented, the method can return to step 215, else continue to step 260. In step 260, the session can be terminated. In step 265, the method can end.

Drawings presented herein are for illustrative purposes only and should not be construed to limit the invention in any regard. It should be appreciated that method 200 can be performed in real-time or near real-time. Further, method 200 can be performed in serial and/or in parallel. It should be appreciated that steps 215-255 can be iteratively performed for all the presentation data available.

Figure 3:
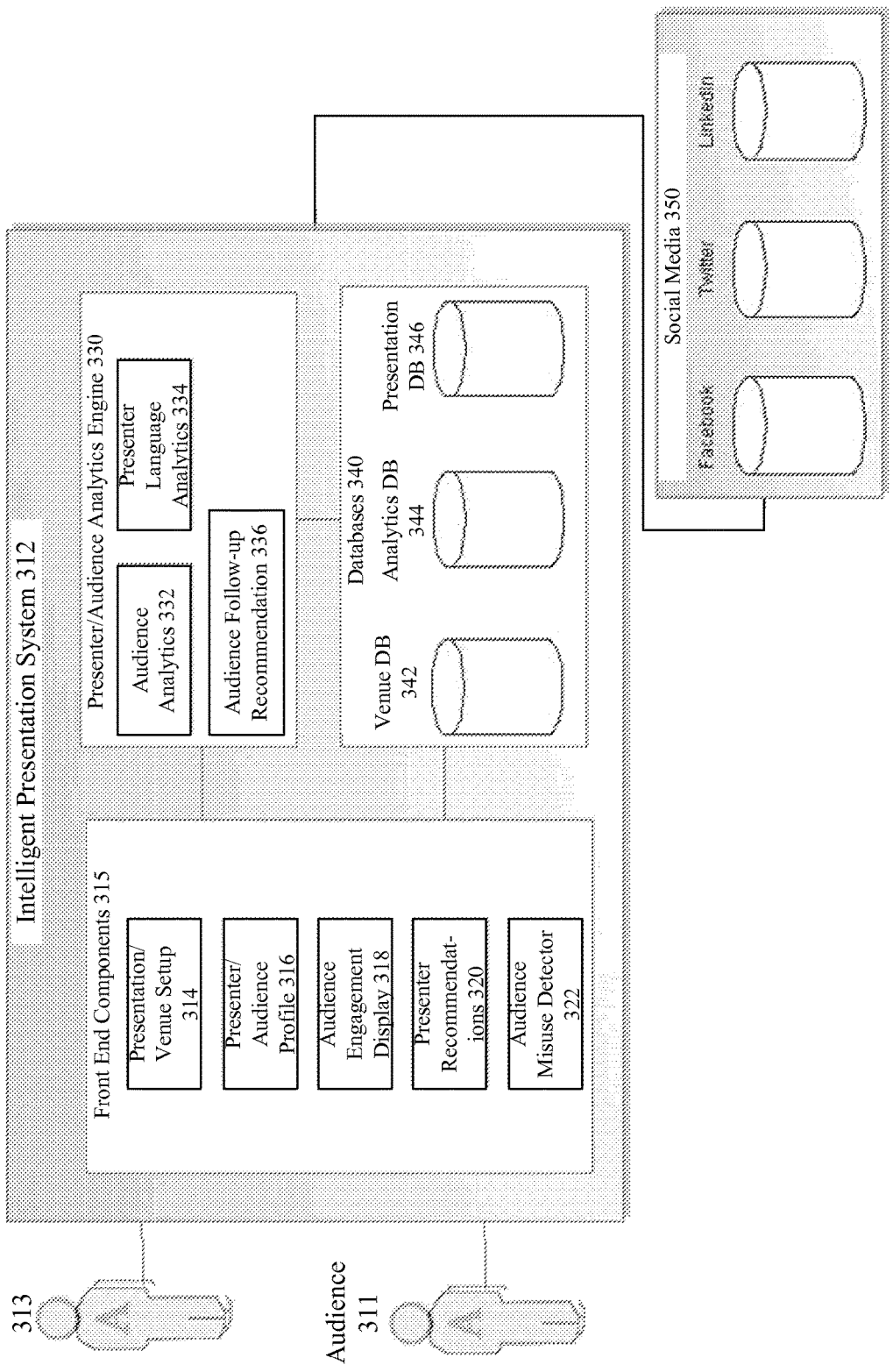
FIG. 3 is a schematic diagram illustrating a system for enhancing presentation content delivery associated with a presentation event in accordance with an embodiment of the inventive arrangements disclosed herein.

FIG. 3 is a schematic diagram illustrating an embodiment 310 in accordance with an embodiment of the inventive arrangements disclosed herein. System 312 can be present in the context of scenario 110, interface 160, 180, method 200, process 410, 450 and/or 510. In embodiment 310, an intelligent presentation system 312 can permit enhanced content delivery and recommended follow up functionality to be available to a presenter 313 and/or audience 311. System 312 can include, but is not limited to, a front end component 315, presenter/audience analytics engine 330, databases 340, and the like. System 312 can include one or more data stores, configuration settings, and the like. In one instance, system 312 can be communicatively linked to one or more social media 350 platforms/services. System 312 components 315, engine 330, database 340 and/or social media 350 can be communicatively linked via one or more networks.

Network can be an electrical and/or computer network connecting one or more system 312 components. Network can include, but is not limited to, twisted pair cabling, optical fiber, coaxial cable, and the like. Network can include any combination of wired and/or wireless components. Network topologies can include, but is not limited to, bus, star, mesh, and the like. Network types can include, but is not limited to, Local Area Network (LAN), Wide Area Network (WAN), Virtual Private Network (VPN) and the like.

Front end components 315 can be one or more data sets, services, and/or computing interfaces (e.g., API, user interface) which permit direct presenter 313 and/or audience 311 interaction. For example, front end components 315 can be user facing services which can enable presenter to view audience engagement display 318 (e.g., interface dashboard 160). Components 315 can include, but is not limited to, presentation venue setup 314, presenter/audience profile 316, audience engagement display 318, presenter recommendations 320, audience misuse detector 322, and the like. It should be appreciated that components 315 can be functionality within a client side computing device, server side computing device, a mobile computing device, and the like. In the instance, detector 322 can utilize traditional and/or proprietary misuse detection algorithms to minimize misuse of system 312 by audience 311. For example, the detector 322 can lock out (e.g., ban/suspend) users which utilize profanity or submit inappropriate questions/comment.

Engine 330 can include, but is not limited to, audience analytics 332, presenter language analytics 334, audience follow-up recommendation 336, and the like. It should be appreciated that engine 330 can be a back-end system which can enable the functionality described herein. It should be understood that engine 330 can include metric collection components, service integration components (e.g., data conversion, service translation), and the like.

Databases 340 can include, but is not limited to, venue database 342, analytics database 344, presentation database 346, and the like. It should be appreciated that database 340 can be a back-end system which can enable the functionality described herein. Database 340 can be a hardware/software component able to persist one or more databases 342-346, data sets (e.g., 316, 320), and the like. Database 340 can be associated with a Storage Area Network (SAN), Network Attached Storage (NAS), and the like. Database 340 can conform to a relational database management system (RDBMS), object oriented database management system (OODBMS), and the like. Database store 340 can be communicatively linked to engine 330, components 315 in one or more traditional and/or proprietary mechanisms. In one instance, database 340 can be a component of Structured Query Language (SQL) complaint database.

Social media 350 can be one or more social network platforms for enabling social media content sharing, social user interactivity, and the like. Media 350 can include, but is not limited to, FACEBOOK, LINKEDIN, TWITTER, YOUTUBE, and the like. It should be appreciated that media 350 can include private enterprise social networks, private virtual social networks (e.g., ad hoc social network), and the like.

It should be appreciated that presenter 313 and audience 311 members can engage with the intelligent presentation system 312 through the use of a device, such as a smart mobile phone, wearable devices (e.g. wrist watch) or computer system. This device can include the ability to capture speech and provide haptic or visual feedback. It can also display relevant actions to the user based on their role. For example, appropriate presentation delivery adjustments can be brought to the attention of the presenter or interactive questions for the audience. Audience members can choose their preferred method to receive notifications (e.g., visual or sensory queues) to enable transmission of information in the least distracting method possible. This flexibility enables specific use cases for both presenters 313 and audience 311 members. For example, if a presenter unknowingly and repeatedly uses superfluous language, such as "like" or "um," the system 312 can respond with a series of vibrations to alert the presenter in an effort to modify their speech. Additional functionality may include flashing a symbol if a key person of interest enters the room or a red/green visual alert to indicate negative or positive audience sentiment, respectively. Finally, the presenter can select an appropriate device to enable the presenter to move around on a front stage or closer to the audience. This can ensure that the presenter not be restricted (e.g., tied to a podium or laptop), which enables the presenter to use the presentation delivery technique the presenter finds is most appropriate for their audience.

For audience 311 members, the use of a device ensures constant engagement. For example, the presenter can choose to send a video clip or a series of questions to create a more interactive experience for each member of the audience 311. While there are many capabilities to system 312, a highly valued capability emerges to permit real time transmission of relevant knowledge/information to a presenter enabling the presenter to choose a style or select material appropriate for a current situation.

Presenter/audience profile 316 can be used to create networks among audience members. The system 312 can determine an audience member's sentiment and can archive the questions asked by the member (e.g., which can be added to their user profile). This data can be utilized to create customized social networks through an audience social collaborator enablement tool (e.g., interface 180). For example, if an audience member is inputting information or thoughts about the scalability of a mobile platform the system can add the tag "scalability" to that member's profile. These tags can allow the system to group audience members with similar interests or areas of expertise and make recommendations to socialize with one another (e.g., social recommendation 182). Adding onto the previous example, the system 312 can recommend a mobile architect as a connection for the audience member who inquired about mobile scalability. A presenter can be notified of this information and can enable the presenter to follow up on various items with any audience members based on their assigned tags. For instance, presenters can send additional database design material to audience members who showed interest in database design (e.g., based on tag "database design". That is, the system 312 can provide immediate relationships to be found and created based on profile 316 information.

Audience engagement display 318 can provide three or more functionalities including, but not limited to, pre-presentation inquiry submission, audience polling, audience presence awareness, and the like. In one instance, the display can present a list of audience questions prior/during a presentation event or can be utilized to push specific media (e.g., short videos) prior to a presentation event to the audience. In the instance, display 318 can include the ability to respond to simple inquires in an automated fashion. In one embodiment, display can permit the presentation of an audience polling tool which can be utilized to periodically poll the audience with questions to enhance audience participation or communicate audience sentiment. In one instance, display 318 can assist the presenter by automatically identifying audience members and key persons of interest. For example, the display can present a heat map of the VIP audience members.

Presenter/audience analytics engine 330 can perform data analytics on audience, audience follow-up, and/or language captured in support of a specific presentation. Engine 330 can handle requests triggered by the front end component 315. Engine 330 can be used to quantify how much interaction took place or understand how audience sentiment changed over time during the presentation event. For example, this capability can be beneficial in its ability to allow entities, such as educational institutions, to measure presentation participation and material comprehension. In one instance, engine 330 can provide follow up recommendations which can allow presenters to incorporate real time feedback to modify presentation content and/or content delivery which current presentation systems lack.

Engine 330 can utilize presenter/member profiles to create "maps" of an audience grouped by topics of interest. The maps can be based on basic information, such as user name, title, interests, or can be arbitrarily complex. For example, the engine can be alerted to cases where a CEO or an audience full of Linux experts is in attendance. That is, the engine 330 can allow a presenter to modify their presentation delivery as necessary in order to communicate at peak efficiency and avoid delivering content that is out of context or inappropriate to the audience.

Drawings presented herein are for illustrative purposes only and should not be construed to limit the invention in any regard. It should be appreciated that components 315 can be components of system 312 optionally operated from a computer, laptop, mobile device, etc. It should be appreciated that one or more components within system 300 can be optional components permitting that a subset of the disclosure functionality be retained. It should be understood that engine 330 components can be optional components providing that engine 330 functionality is maintained. It should be appreciated that one or more components of engine 330 can be combined and/or separated based on functionality, usage, and the like. System 312 can conform to a Service Oriented Architecture (SOA), Representational State Transfer (REST) architecture, and the like. In one instance, engine 330 can be a functionality of an IBM DOMINO or IBM COGNOS, software.

It should be appreciated that system 312 can be associated with security capabilities including, but not limited to, encryption, user authentication, user verification, and the like.

Figure 4A:
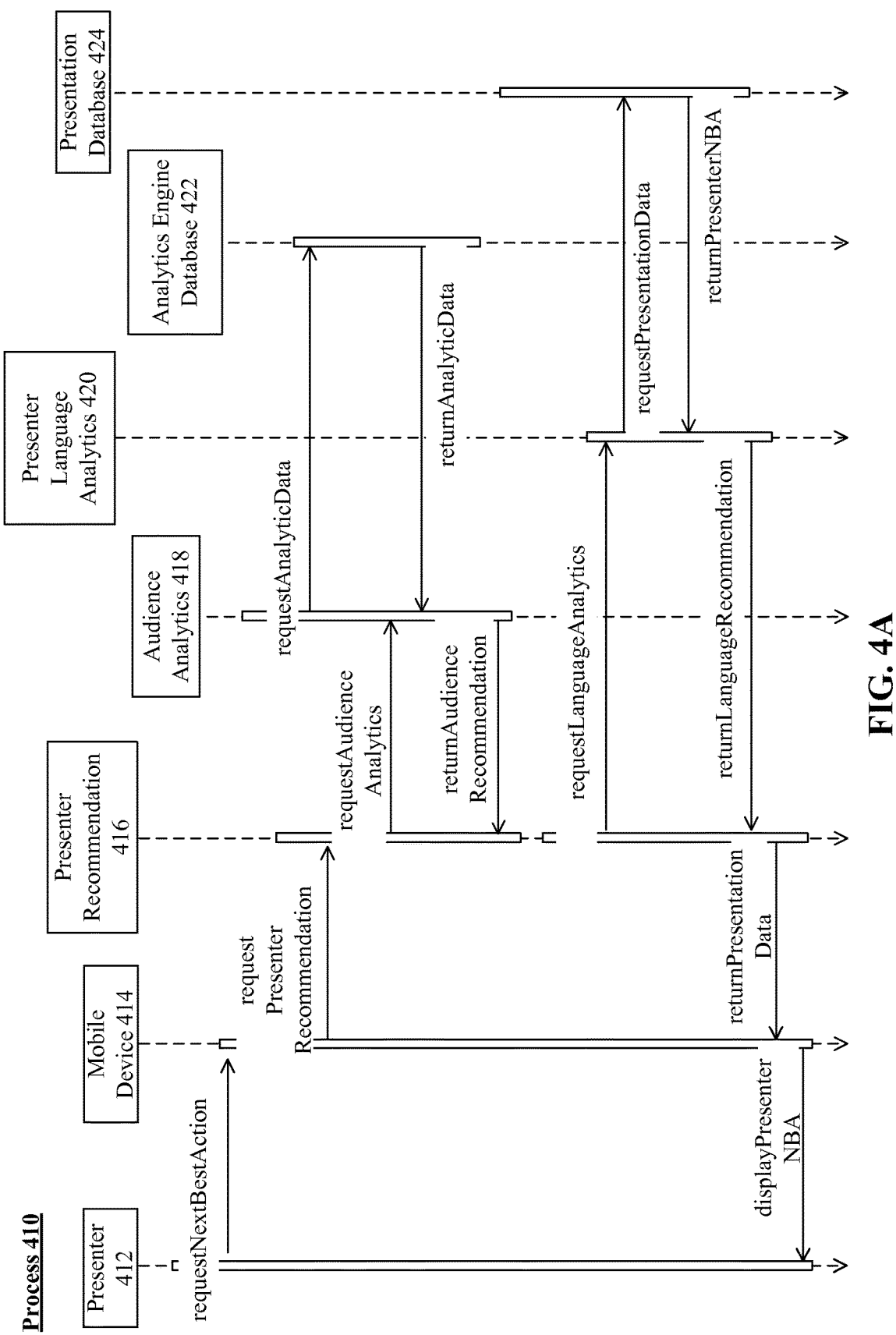
FIG. 4A is a schematic diagram illustrating a process for enhancing presentation content through automated content delivery and recommendation delivery in associated with a presentation event in accordance with an embodiment of the inventive arrangements disclosed herein.

FIG. 4A is a schematic diagram illustrating a process 410 for enhancing presentation content delivery associated with a presentation event in accordance with an embodiment of the inventive arrangements disclosed herein. Processes 410, 450 can be present in the context of scenario 110, method 200, embodiment 310, and/or process 510.

Process 410 can represent a control flow for a recommendation generation and presentation within a user interface. Presenter 412 can utilize a dashboard interface on a mobile device 414 to request a recommendation (e.g., next best action). The dashboard can leverage a presenter recommendation 416 which can request audience analytics information from a presenter/audience analytics engine 418. Audience analytics can be performed utilizing data from an analytics engine database 422 and database 424. Resulting data can be returned from the audience analytics 418 component to a presenter recommendations 416 (e.g., functionality of the dashboard). An additional request for language analytics can be sent from the presenter recommendation 416 to the presenter language analytics 420. It should be appreciated that audio from a presentation can be delivered in real-time to the presenter language analytics 420 component for natural language processing/assessment. In one instance, the presenter language analytics 420 component can return language recommendations to the presenter recommendation 416 component. Recommendations can include, but is not limited to, overused word recommendation, grammar corrections, sentence structure recommendations, and the like. Presenter recommendation 416 component can aggregate collected data and presents the data via a presenter dashboard (e.g., user experience component).

Figure 4B:
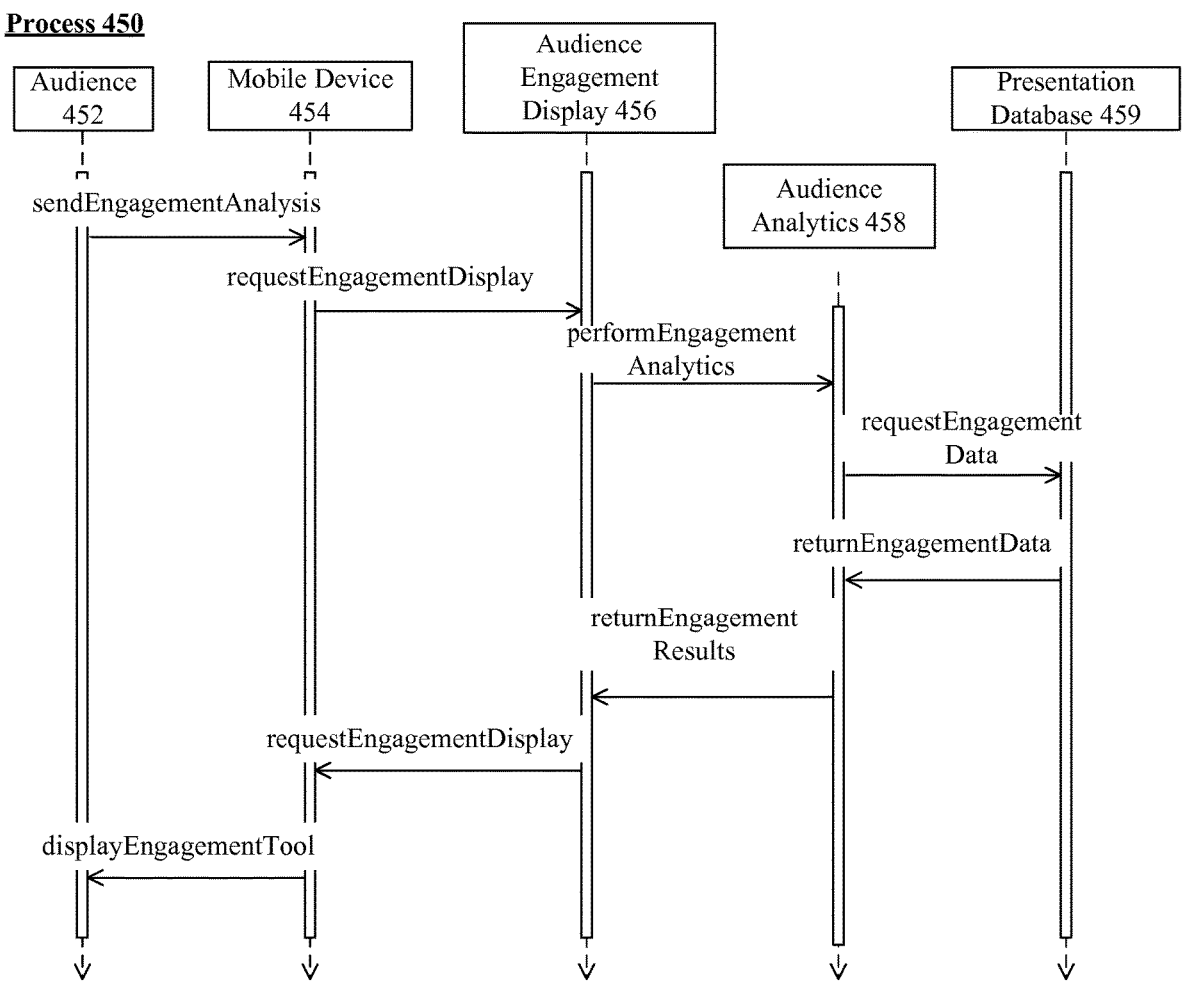
FIG. 4B is a schematic diagram illustrating a process for enhancing presentation content through automated content delivery and recommendation delivery in associated with a presentation event in accordance with an embodiment of the inventive arrangements disclosed herein.

FIG. 4B is a schematic diagram illustrating a process 450 for enhancing presentation content through automated content delivery and recommendation delivery in associated with a presentation event in accordance with an embodiment of the inventive arrangements disclosed herein.

Process 450 can represent a control flow for manual and/or automatic content delivery and presentation within a user interface. For example, the process can push video/questions/engagement items to an interface of an audience's mobile device (e.g., device 454). In one instance, an audience member 452 can utilize an audience engagement display 456 component to submit a question regarding the engagement presentation content. Audience engagement display 456 can trigger an audience analytics 458 component to determine the question's relation to the engagement presentation content. Audience analytics 458 component can interrogate the presentation database 459 to determine a best fit response to the question. In addition, information can be stored in the presentation database 459 to track question frequency (e.g., popularity). Presentation database 459 can respond with an appropriate engagement data to the audience analytics 458 component which can aggregate additional information and return a response to the audience engagement display 456. Audience engagement display 456 can present the resulting engagement data in an audience dashboard component to the audience member that submitted the question.

Drawings presented herein are for illustrative purposes only and should not be construed to limit the invention in any regard. It should be appreciated that process 410, 450 can represent exemplary processes of the functionality described herein.

Figure 5:
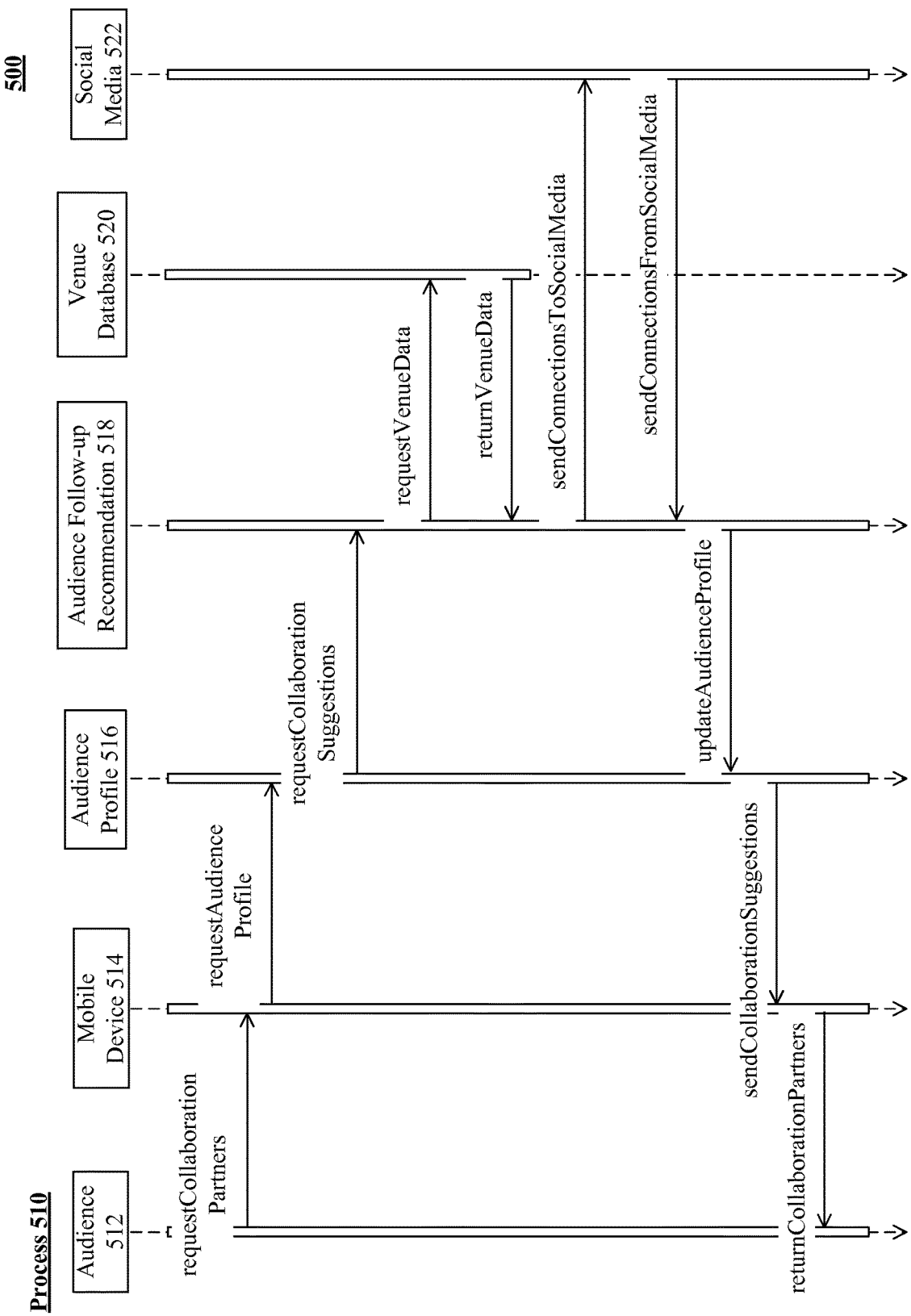
FIG. 5 is a schematic diagram illustrating a process for enhancing presentation content delivery by leveraging social collaboration in accordance with an embodiment of the inventive arrangements disclosed herein.

FIG. 5 is a schematic diagram illustrating a process for enhancing presentation content delivery associated with a presentation event in accordance with an embodiment of the inventive arrangements disclosed herein. Process 510 can be present in the context of scenario 110, method 200, embodiment 310, and/or processes 410, 450.

Process 510 can represent a control flow for enabling social collaboration between audience members within a user interface of a mobile device 514. Audience 512 member can utilize an audience profile 516 component which can produce collaboration recommendations. Audience profile 516 component can issue a request for a collaboration recommendation from the audience follow-up recommendation 518 analytic engine. Audience follow-up recommendation 518 analytic engine can assess a venue database 540 to determine a list of potential collaborators for an audience member. The list can be refined by the audience follow-up recommendation 518 analytics engine which can perform social media 522 analytics on the list of collaborators. Social media information (e.g., information in FACEBOOK, TWITTER, etc.) can be searched and appropriate information can be returned which can refine the list of potential collaborators to the audience follow-up recommendation 518 component. Audience follow-up recommendation 518 component can perform an analysis and can return an appropriate resulting list of potential collaborators to an audience dashboard.

Drawings presented herein are for illustrative purposes only and should not be construed to limit the invention in any regard. It should be appreciated that process 510 can represent exemplary processes of the functionality described herein.

The flowchart and block diagrams in the FIGS. 1A-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of enhancing presentation delivery comprising:
    detecting a presenter and an audience associated with a presentation event, wherein the presentation event is of a real world occurrence and a computing session occurrence, wherein the presenter conveys presentation content to the audience;
    identifying presentation data associated with the presentation event, wherein the presentation data comprises of the presentation content, wherein the presentation content comprises of at least one of a text, a media, and any other form of communication used to transfer knowledge from the presenter to the audience;
    during the presentation event, capturing at least one of a real-time metrics associated with the presenter and the audience from at least one computing device associated with the presenter and the audience, the real-time metrics comprising a multiplicity of questions received from the audience;
    analyzing the real-time metrics by interrogating a database with a question asked by a corresponding member of the audience to determine a presenter recommendation associated with the question, the presenter recommendation including an overused word recommendation, a grammar correction recommendation, a sentence structure recommendation, a recommendation to spend additional time discussing confusing content, and a recommendation to switch to supplemental presentation content; and
    during the presentation event, presenting the presenter recommendation to the presenter while presenting in an audience dashboard component of an audience engagement display to the corresponding member of the audience, a recommended social network connection with another member of the audience who has asked a similar question as the question asked by the corresponding one member of the audience.

2. The method of claim 1, wherein the presentation data comprises of at least one of a presentation event venue data, wherein the venue data comprises of at least one of a physical venue organization, venue layout, and a venue resource availability.

3. The method of claim 1, further comprising:
    aggregating the real-time metrics and audience data for each member of the audience into a user profile.

4. The method of claim 1, further comprising:
    collecting at least one metric associated with an audience interaction with the presentation content.

5. The method of claim 1, further comprising:
    presenting to the presenter a snapshot view of audience during the presentation event, wherein the snapshot view comprises a real-time metric associated with the audience via an audience computation device.

6. The method of claim 1, wherein:
    the real-time metrics comprise a number of times the presenter uses superfluous language during the presentation event, the presenter recommendation comprising a series of vibrations to alert the presenter in an effort to modify the speech of the presenter during the presentation event.

7. The method of claim 1, further comprising:
    presenting a presenter dashboard interface associated with a device, wherein the dashboard comprises of a presentation event time, a presenter voice metric and a presenter word metric.

8. The method of claim 1, further comprising:
    detecting a presenter voice command during presentation content delivery, wherein the command is an annotation command, wherein the command triggers an automated annotation functionality.

9. A system of enhancing presentation delivery comprising:
a computer with memory and at least one processor;
a presentation engine executing in the memory of the computer and configured to enhance a presentation content delivery associated with a presentation event, wherein the enhancement is at least one of a presenter recommendation, wherein the presentation content comprises of at least one of a text, a media, and any other form of communication used to transfer knowledge from a presenter to an audience, wherein the presenter recommendation is a recommendation for improving content delivery, wherein the event is associated with the presenter and the audience, wherein the content delivery is automatically performed responsive to real-time metrics obtained from the audience, the real-time metrics comprising a multiplicity of questions received from the audience, wherein the presentation engine analyzes the real-time metrics by interrogating a database with a question asked by a corresponding member of the audience to determine the presenter recommendation associated with the question, the presenter recommendation including an overused word recommendation, a grammar correction recommendation, a sentence structure recommendation, a recommendation to spend additional time discussing confusing content, and a recommendation to switch to supplemental presentation content, and during the presentation event, to present the presenter recommendation to the presenter while presenting in an audience dashboard component of an audience engagement display to the corresponding member of the audience, a recommended social network connection with another member of the audience who has asked a similar question as the question asked by the corresponding one member of the audience; and
a data store coupled to the computer and configured to persist at least one of the presentation content and a user profile associated with at least one of the presenter and the audience.

10. The system of claim 9, further comprising:
a presentation component configured to capture and analyze presenter data, wherein the presenter data comprises of real-time metrics associated with the presenter;
an audience manager able to capture and analyze presenter data, wherein the audience data comprises of real-time metrics associated with at least one member of the audience;
an analytics configured to analyze the presenter data and audience data to determine the presenter recommendation and the audience recommendation.

11. The system of claim 9, further comprising:
the data store storing a presenter and an audience profile, wherein the profile comprises of social networking data for recommending a social network member.

12. The system of claim 9, further comprising:
the audience manager collecting user input from an audience member during the presentation event, wherein the input is at least one of a user comments, a user polling data, a location, and any other user feedback to enhance a presentation.

13. The system of claim 9, further comprising:
the presenter component presenting to a presenter a snapshot view of audience state during the presentation, wherein the audience state is at least one of an audience sentiment and an audience interest level.

14. The system of claim 9, wherein:
the real-time metrics comprise a number of times the presenter uses superfluous language during the presentation event, the presenter recommendation comprising a series of vibrations to alert the presenter in an effort to modify the speech of the presenter during the presentation event.

15. The system of claim 9, further comprising:
the presenter component during the presentation event, presenting to the presenter a graphical map of a venue associated with the presentation event, wherein map indicates at least one audience member and their key attributes.

16. The system of claim 9, further comprising:
the presenter component detecting a voice command during the presentation event, wherein the command is an annotation command, wherein the command triggers a annotation functionality.

17. A computer program product comprising a computer readable storage medium having computer usable program code embodied therewith, wherein the computer readable storage medium is not a transitory signal per se, the computer usable program code comprising:
detecting a presenter and an audience associated with a presentation event, wherein the presentation event is at least one of a real world occurrence and a computing session occurrence, wherein the presenter conveys presentation content to the audience;
identifying a presentation data associated with the presentation event, wherein the presentation data comprises of the presentation content, wherein the presentation content comprises of at least one of a text and a media;
capturing at least one of a real-time metrics associated with the presenter and the audience from at least one computing device associated with the presenter and the audience, the real-time metrics comprising a multiplicity of questions received from the audience;
analyzing the real-time metrics by interrogating a database with a question asked by a corresponding member of the audience to determine a presenter recommendation associated with the question, the presenter recommendation including an overused word recommendation, a grammar correction recommendation, a sentence structure recommendation, a recommendation to spend additional time discussing confusing content, and a recommendation to switch to supplemental presentation content; and
presenting, during the presentation event, the presenter recommendation to the presenter while presenting in an audience dashboard component of an audience engagement display to the corresponding member of the audience, a recommended social network connection with another member of the audience who has asked a similar question as the question asked by the corresponding one member of the audience.

18. The computer program product of claim 17, wherein the computer program product is an IBM DOMINO, IBM COGNOS and/or IBM WATSON software.

* * * * *